United States Patent [19]

Ketola

[11] Patent Number: 5,172,022

[45] Date of Patent: Dec. 15, 1992

[54] MOTORCYCLE ALTERNATOR WITH ALTERNATIVE MOUNTING

[76] Inventor: Dana A. Ketola, 4210 NE. 39th St., Vancouver, Wash. 98661

[21] Appl. No.: 763,518

[22] Filed: Sep. 23, 1991

[51] Int. Cl.⁵ .............................................. H02K 5/00
[52] U.S. Cl. .................................. 310/91; 310/68 D; 310/89
[58] Field of Search .................. 310/68 D, 89, 91; 74/421 A

[56] References Cited

U.S. PATENT DOCUMENTS

| | | | |
|---|---|---|---|
| 3,602,747 | 8/1971 | Stroppa | 310/68 D |
| 3,787,014 | 1/1974 | Story et al. | 310/91 |
| 4,221,982 | 9/1980 | Raver et al. | 310/68 D |
| 4,506,179 | 3/1985 | Chernoff et al. | 310/91 |

Primary Examiner—Steven L. Stephan
Assistant Examiner—Matthew Nguyen
Attorney, Agent, or Firm—Richard C. Litman

[57] ABSTRACT

An alternator apparatus for use with motorcycles has a first end connected to a second end via an elongated cylindrical body. The body encloses several elements which are used to produce a steady output voltage. Also disclosed is a shaft, which is inserted into one of the ends, that has three different configured sections made from a monolithic piece of material, and paired bore holes for mounting the alternator apparatus to the motorcycle.

20 Claims, 1 Drawing Sheet

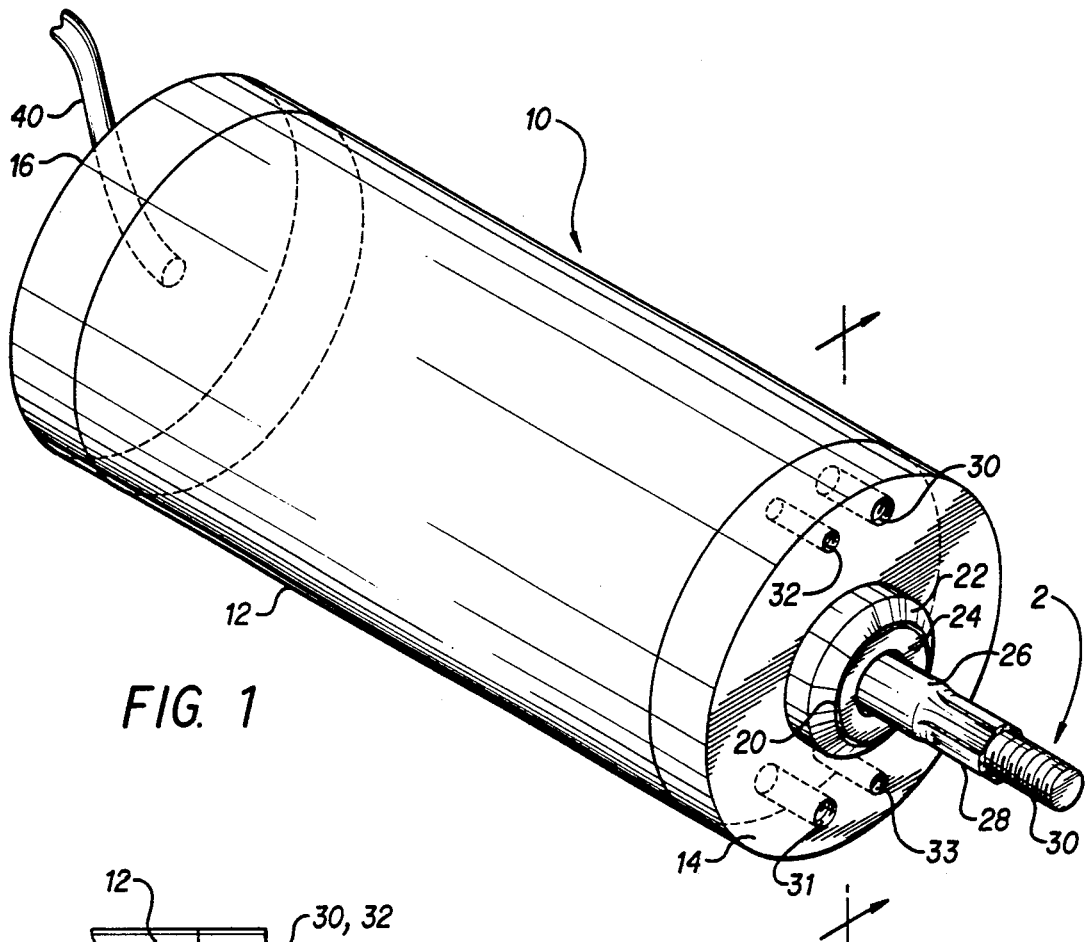
FIG. 1
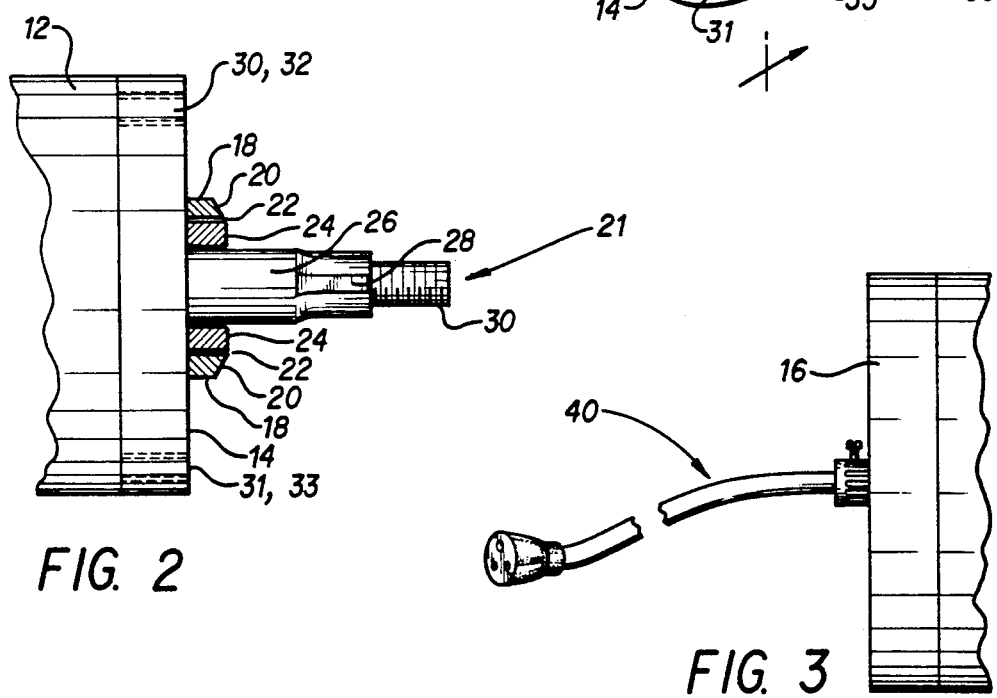
FIG. 2
FIG. 3

MOTORCYCLE ALTERNATOR WITH ALTERNATIVE MOUNTING

FIELD OF THE INVENTION

The present invention discloses an alternator apparatus for use with motorcycles. The alternator apparatus includes a housing having two ends and an elongated cylindrical body, and a shaft that is made from a monolithic piece of material.

DESCRIPTION OF THE RELATED ART

Attempts have been made to make alternators for use with motorcycles, such as U.S. Pat. No. 4,908,540 issued to Motodate, et al. However, the patent fails to disclose or suggest the present invention as claimed herein. More specifically, the patent fails to disclose the end members, the bore holes and the shaft as disclosed herein.

SUMMARY OF THE INVENTION

The present invention relates to an alternator apparatus for use with motorcycles. The apparatus is to be mounted within or on a motorcycle.

Accordingly, an object of the present invention is to provide an alternator apparatus with a housing that can be mounted on motorcycles.

Another object of the present invention is to provide an alternator apparatus with shaft means for driving elements enclosed within a housing.

Still another object of the present invention is to provide an alternator apparatus with shaft means that includes three distinct sections.

A further object of the present invention is to provide an alternator apparatus with a plurality of paired bore holes wherein said holes have different diameters.

These and other objects regarding the features on the present invention will become apparent to those skilled in the art, such as having shaft means with more than three distinct sections.

BRIEF DESCRIPTION OF THE INVENTION

FIG. 1 shows an alternator apparatus according to the present invention.

FIG. 2 shows a cutaway view of one end of the alternator apparatus according to the present invention taken along line 2—2 of FIG. 1.

FIG. 3 shows a view of the other end of the alternator apparatus according to the present invention.

DESCRIPTION OF THE PREFERRED EMBODIMENT

An alternator apparatus, as indicated by reference numerical 10, is disclosed in FIG. 1. A cylindrical body 12 is attached to a first end 16 and a second end 14. The body 12 houses elements to produce a steady output voltage on power cable 40. It is very well known in the art of alternators that stators, rotors and electronic elements are used to produce a steady voltage. Therefore such elements are not described herein for the sake of clarity. The present invention is more drawn to the shaft for driving a rotor and means for mounting the alternator apparatus to a vehicle.

A second end 14 has included, as being part of the second end, a protruding member 18. The member 18 is cylindrical in shape and includes an opening 20. Between an outer surface of member 18 and the opening 20 there is an angled taper 22. A roller bearing 24 is placed inside the opening 20. The bearing 24 has a hole 34 therein to receive a shaft 21. The shaft 21, which is attached to a rotor inside the body 12 (not shown), has three distinct shaped sections.

The shaft 21 is made from a monolithic piece of material. A first section 26 is cylindrical in shape and has a smooth surface. As shown in FIG. 2, the first section 26 is inserted into the body 12, through the bearing or bushing 24. A second section 28 includes a plurality of teeth, which are made by tooling out material of the shaft 21. The third section 30 includes a plurality of threads. The threads, like the teeth of the second section, are made by tooling out, material from a third part of the shaft 21. Each of the three sections 26, 28, 30 of shaft 21 has different diameters. The first section 26 has the largest diameter and the third section 30 has the smallest diameter. The second section 28 is made to receive a gear (not shown) for driving the shaft 21. The diameter of the second section 28 increases to provide an abutment as it approaches the first section 26. The gear, when placed on the shaft 21, comes in contact with this abutment. The third section 30 is made to receive a nut (not shown) to keep the gear in place.

Further included in the alternator apparatus 10 are a plurality of paired bore holes. Two pairs of bore holes (30,31) and (32,33), respectively, are shown in the second end 14. Each of the paired bore holes (30,31), (32,33) are threaded to receive bolts (not shown). Depending on the installation of the apparatus 10, either pair of the bore holes (30,31), (32,33) may be used to mount the apparatus 10 to a motorcycle (not shown). The bolts used to mount the apparatus 10 will first go through a mounting bracket (not shown) on the motorcycle, then screw into the apparatus 10 to hold the apparatus 10 in place. The bore holes (30,31), (32,33) are spaced apart 180 degrees to obtain maximum support. The first pair of bore holes (30,31) has a larger diameter than the second pair of bore holes (32,33). By having bore holes with different diameters, the alternator apparatus 10 can be mounted on a variety of motorcycles.

Referring to FIG. 3, the first end 16 has extended therefrom a power cord 40 that includes a connector 42. The connector 42 can be attached to a battery (not shown) to keep the battery charged. The connector may be either a male or female connector 42 depending on the battery terminal.

Although the instant invention has been described with respect to specific details of certain preferred embodiments thereof, it is not intended that such details limit the scope of the instant invention, except as is set forth in the following claims.

I claim:

1. An alternator apparatus for use with motorcycles that produces a stable voltage comprising:

housing means having a predefined shape for enclosing elements therein, said housing means including a first end connected to a second end through an elongated member;

said first end including electrical leads extended therefrom;

said second end including a protruding member, said protruding member being made as an integral part of said second end;

said protruding member including an opening therein such that a space is created between an outer surface of said protruding member and said opening, said space being closed by an angled taper between said outer surface and said opening;

a bearing being included within said opening, said bearing being of the disk roller type and including a hole through its center;

shaft means being placed into said hole for driving some of said enclosed elements, said shaft means including a plurality of differently configured sections;

and, said housing means including a plurality of different size paired bore holes in said second end;

whereby, one pair of said paired bore holes may be used for mounting the alternator apparatus to the motorcycle.

2. An alternator apparatus as claimed in claim 1 wherein said plurality of differently configured sections includes a first section that is cylindrical in nature and has a smooth surface.

3. An alternator apparatus as claimed in claim 2 wherein said plurality of differently configured sections includes a second section that is cylindrical in nature and has a plurality of teeth that run along the length of a cylindrical part.

4. An alternator apparatus as claimed in claim 3 wherein said plurality differently configured sections includes a third section that is cylindrical in nature and is threaded.

5. An alternator as claimed in claim 1 wherein said plurality of differently configured sections are made from a monolithic piece of material.

6. An alternator apparatus as claimed in claim 1 wherein said plurality of different size paired bore holes include a first pair of bore holes having a first diameter.

7. An alternator apparatus as claimed in claim 6 wherein said plurality of different size paired bore holes include a second pair of bore holes having a second diameter.

8. An alternator apparatus as claimed in claim 7 wherein said first pair of bore holes includes a first bore hole being placed on the opposite side of said opening from a second bore hole.

9. An alternator apparatus as claimed in claim 7 wherein said second pair of bore holes includes one bore hole being placed on the opposite side of said opening from another bore hole.

10. An alternator apparatus as claimed in claim 6 wherein said first pair of bore holes includes a first bore hole being placed on the opposite side of said opening from a second bore hole.

11. An alternator apparatus as claimed in claim 1 wherein said plurality of different size paired bore holes includes a first bore hole of one pair being next to one bore hole of another pair.

12. An alternator apparatus as claimed in claim 1 wherein said plurality of different size paired bore holes includes a first pair of bore holes having a larger diameter than a second pair of bore holes.

13. An alternator apparatus as claimed in claim 12 wherein said first pair of bore holes includes a first bore hole being placed on the opposite side of said opening from a second bore hole.

14. An alternator apparatus as claimed in claim 12 wherein said second pair of bore holes includes one bore hole being placed on the opposite side of said opening from another bore hole.

15. An alternator apparatus as claimed in claim 12 wherein a first bore hole of said first pair is next to one bore hole of said second pair.

16. An alternator apparatus as claimed in claim 12 wherein said plurality of differently configured sections includes a first section that is cylindrical in nature and has a smooth surface.

17. An alternator apparatus as claimed in claim 16 wherein said plurality of differently configured sections includes a second section that is cylindrical in nature and has a plurality of teeth that run along the length of a cylindrical part.

18. An alternator apparatus as claimed in claim 17 wherein said plurality of differently configured sections includes a third section that is cylindrical in nature and is threaded.

19. An alternator apparatus, as claimed in claim 18 wherein said plurality of differently configured sections are made from a monolithic piece of material.

20. An alternator apparatus as claimed in claim 12 wherein said plurality of differently configured sections are made from a monolithic piece of material.

* * * * *